July 3, 1951 — A. A. WARNER — 2,559,485
PROPELLER SHAFT AND UNIVERSAL JOINT ASSEMBLY
Filed May 1, 1944
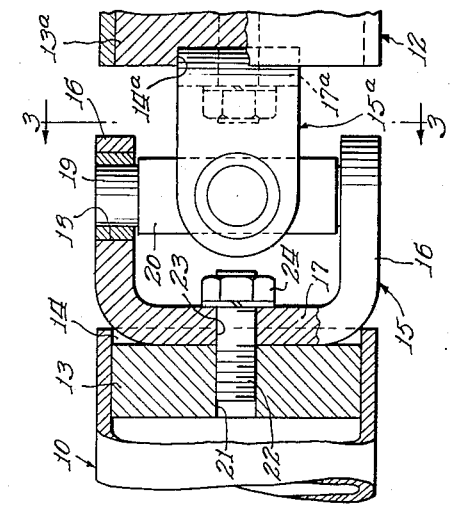
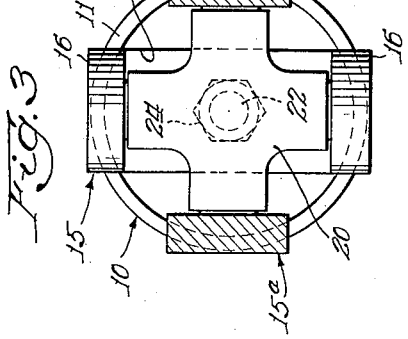
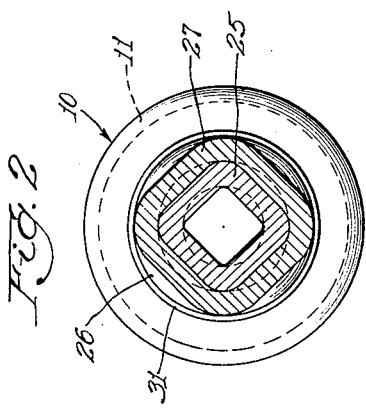
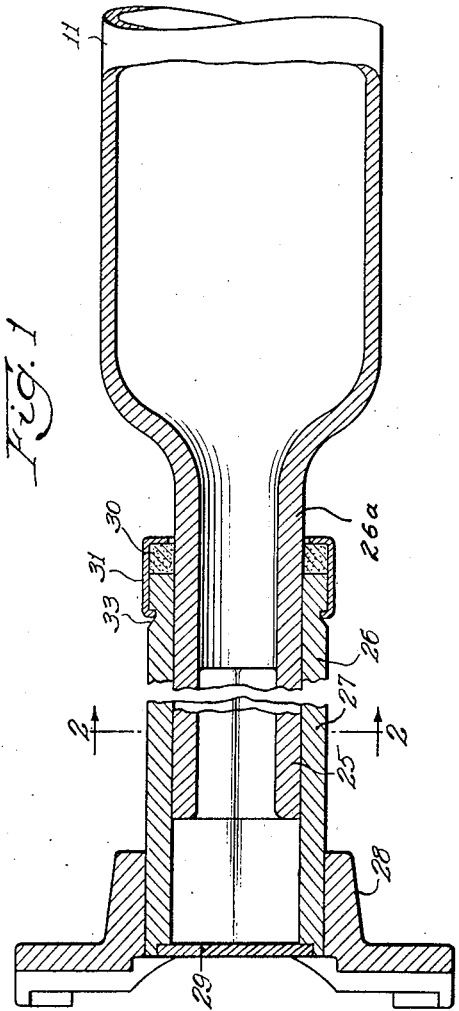
Inventor:
Archibald A. Warner
By: Edward C. Fitzpatrick
Atty.

Patented July 3, 1951

2,559,485

UNITED STATES PATENT OFFICE 2,559,485

PROPELLER SHAFT AND UNIVERSAL JOINT ASSEMBLY

Archibald A. Warner, Rockford, Ill., assignor to Borg-Warner Corporation, Chicago, Ill., a corporation of Illinois Application May 1, 1944, Serial No. 533,586

10 Claims. (Cl. 64—17)

1

The present invention relates to a propeller shaft and universal joint assembly, preferably such as those employed in the driving mechanism of a motor vehicle, motor boat, and the like. Heretofore, in assemblies of this character it has been the practice to employ solid rods, castings and up-set forgings for many of the component parts of the structure. These instrumentalities are expensive because they require special machining and handling in the preparation of such parts as well as in the assembling thereof. In carrying out the present invention, readily available stock items, simple stampings, and the like are utilized, and these parts are interfitted together with relation to each other and are joined together by brazing or otherwise bonding contacting surfaces thereof to each other to effect unitary structures.

It is one of the principal objects of this invention to simplify the construction of an assembly of the character contemplated herein, and to improve the efficiency, operation and dependability of such assembly.

Another of the principal objects hereof is to provide an arrangement for the ready assembly and disassembly of the universal joint that may be accomplished without disturbing the respective shafts with which the parts of the universal joint cooperate. In this connection, the means for mounting the yokes of the joint effect an accurate positioning of each yoke with respect to its shaft and when assembled in the manner herein disclosed these mounting means are effective to prevent movement of the yoke independently of its shaft.

A further object of this invention is to provide a propeller shaft and universal joint assembly that is fabricated from commercially available stock items and certain pre-formed members that effect a material reduction in the production cost of the assembly as compared with the expensive up-set forgings and the specially machined parts that heretofore have been required in assemblies of this character.

The present invention aims to reduce the number of component parts usually required in a propeller shaft and universal joint assembly, and to accomplish this end without detracting from the efficiency of the assembled structure. In this connection, the usual toothed splines between the propeller and transmission shafts are dispensed with and in lieu thereof stock cylindrical tubes having portions of deformed cross section are effectively utilized in the present assembly. Also the yokes of the universal joint contemplated

2 herein comprise simple stampings made from metal bars, or pieces of rolled metal of the required cross section that are cut to the proper dimension.

Additional objects, aims, and advantages of the present invention will be apparent to persons skilled in the art after the construction and operation of the present assembly is understood from the within description.

It is preferred to accomplish the numerous objects of this invention and to practice the same in substantially the manner hereinafter fully described and as more particularly pointed out in the appended claims, reference being made to the accompanying drawings that form a part of this specification, wherein:

Fig. 1 is a longitudinal elevation, partly in section, of a propeller shaft and universal joint assembly embodying the invention contemplated herein;

Fig. 2 is a transverse section thereof taken on the plane of line 2—2 on Fig. 1 the plane being rotated through 90 degrees; and Fig. 3 is a transverse section taken on the plane of line 3—3 on Fig. 1.

The drawings are to be understood as being more or less of a schematic character for the purpose of disclosing a typical or preferred form of the improvements that are contemplated herein, and in these drawings like reference characters identify the same parts throughout the several views.

The assembly shown in Fig. 1 comprises a propeller shaft 10 that is preferably an elongated hollow tube the major portion 11 of which has a cylindrical cross section. This tube is a commercially available stock item or is readily produced commercially and its cylindrical wall is a gauge of metal that is ample to transmit torque when used as a driving member in a motor vehicle, motor boat and the like. The ends of this tube are adapted for connection by means of universal joints with other shafts that may have their axes disposed obliquely to the axis of this tubular shaft 10.

The end of the cylindrical portion 11 of the tubular shaft 10 carries a mounting for one of the yokes of a universal joint that operatively connects said shaft to the opposed adjacent end of the tubular transmission shaft 12. In order to effect this mounting a relatively thick metal block or plug 13 is inserted into the end of the tube 10 and brazed or otherwise bonded thereto. It will be understood the other edge surface of the block 13 conforms with the internal surface of the tube 10 with a minimum clearance between these parts that permits the block being forcibly inserted into the tube 10 to effect a tight fit prior to the brazing or bonding together of these parts. The outer face of the block has a diametrically disposed channel or recess 14 extending preferably across or from side to side thereof. The opposite side walls of the channel provide abutments between which a yoke 15 of a universal joint is seated and prevented from movement independent of the block and tubular shaft.

The yoke comprises a flat piece of metal of a width to fit channel 14 and it has a substantially U-shape that is produced by pre-forming the metal piece by a stamping operation. In lieu of stamping the yokes from a metal piece they may be pieces cut transversely from a rolled metal bar having a channeled or U-shaped cross section. This provides the spaced parallel yoke arms 16 that are connected by transverse member 17 of the U. Preferably during the stamping operation that pre-forms the yoke 15, the bearing holes 18 are made in the outer portions of the arms 16 to journal the trunnions 19 of the intermediate spider or cross member 20 that operatively connects the respective yokes of the universal joint. The opposing end of the other shaft 12 is provided with a block or plug 13a that has a channeled seat 14a to receive the U-shaped yoke 15a. These yokes may be detachably anchored in position by providing threaded bores 21 in the centers of the blocks 13 and 13a into which threaded studs 22 are screwed and the intermediate or transverse portions 17 and 17a have smooth bores 23 through which the studs are disposed and out of which said studs protrude. Clamping means such as nuts 24 are turned onto the outer ends of the studs and tightened against the adjacent surfaces of the yokes to tightly draw or clamp them in their respective seats 14 and 14a. The arrangement described detachably mounts the yokes of the universal joint upon the respective shafts and it effectively prevents movement of a yoke independent of its shaft. Thus should a joint break, it may be readily replaced by a new one without dismantling the entire drive system.

At its end portion that is opposite the universal joint hereinbefore described, the cylindrical tubular shaft 10 is reduced in cross section and then may be formed into a shape that is rectangular in cross section as illustrated in Fig. 2 for the purpose of producing a driving slip joint. In order to accomplish this the cylindrical tube is subjected to swaging operations in a forge that compresses the walls radially inward in a symmetrical manner to retain the circular contour and then flattens the opposite sides of the reduced tube and produces a terminal portion 25 that is of rectangular cross section as shown in Fig. 2. Due to the fact that the swaging operation reduced the diameter of the tube 10, the wall of this reduced rectangular portion 25 will become thicker than the cylindrical portion 11. It will be understood the cross section of the end or terminal portion 25 of the tube need not be of the rectangular shape shown, but it may be swaged into other shapes that render the portion 25 adaptable to transmit torque to or from another tubular member telescoped therewith.

In the present instance the member that coacts with the rectangular terminal portion 25 comprises a cylindrical hollow stub 26 that is telescoped upon the adjacent cylindrical portion 26a of the tubular shaft 10. This stub is subjected to swaging operations to flatten opposite sides thereof which produces a portion 27 of rectangular cross section and having internal dimensions that permit it to fit snugly upon the rectangular terminal portion 25 of the shaft 10. By this arangement there may be relative longitudinal movement between these telescoped parts but at the same time independent rotative movements thereof with respect to each other is prevented. The internal dimension of the cylindrical portion 26 of the tubular stub is sufficient to effect a sliding engagement thereof with the adjacent outside surface of the cylindrical tubular shaft 10. The rectangular end 27 of the stub 26 is fitted into a correspondingly shaped opening in the central portion of a universal joint yoke 28 to which it is brazed or bonded in any suitable manner.

For the purpose of excluding dirt and other extraneous matter the end of the rectangular terminal 27 of the stub 26 is closed by a closure member 29 that is inserted into the end and anchored thereto. In order to prevent escape of lubricant between the slidingly telescoped portions of the assembly, a seal ring 30 surrounds the tubular shaft 26a at the end of the cylindrical portion 26 of the stub, said ring being maintained in position by means of an annular retainer 31 having an in-turned edge that projects into and engages an annular notch 23 in the adjacent portion of the stub.

It is understood that a different type of yoke is shown at each end of tube 10 merely for purposes of illustration and that the same type of universal joint may be used at both ends. It is further understood that studs 22 may be dispensed with and yokes 15 and 15a secured permanently to blocks 13 and 13a by brazing alone.

While this invention has been described in detail in its present preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. A propeller shaft and universal joint assembly comprising an elongated tubular shaft; a block anchored in an end of said shaft and having spaced confronting abutments on its outer face; a universal joint yoke having a portion that is positioned between the abutments on said block with its arms projecting laterally therefrom; and means for securing said yoke in the aforesaid position.

2. A propeller shaft and universal joint assembly as defined in claim 1, wherein the means for securing the yoke in position comprise a threaded stud projecting from said block through the yoke; and a nut screwed upon the projecting portion of said stud and engaged with a portion of the yoke.

3. A propeller shaft and universal joint assembly comprising an elongated tubular shaft; a block anchored in an end of said shaft and having a diametrically disposed channel in its outer face providing a seat for a yoke; a U-shaped yoke positioned in said seat and disposed with its arms projecting laterally from said block; and means for demountably securing said yoke in said seat.

4. A propeller shaft and universal joint assembly comprising an elongated tubular shaft; a mounting member fixed in an end of said shaft and presenting spaced abutments defining a channel at the end portion of said shaft, said channel being closed at opposite ends thereof by said end portion of said shaft; and a yoke mounted between said abutments and secured thereto.

5. A propeller shaft and universal joint assembly as defined in claim 4 wherein means are provided for demountably anchoring said yoke.

6. A propeller shaft and universal joint assembly comprising an elongated tubular shaft; a universal joint yoke; a member wholly confined within and fixed in an end of said shaft and having spaced confronting abutments on its outer face positioning therebetween a portion of said yoke on said member with the arms of said yoke projecting laterally therefrom; and means for securing said yoke in the aforesaid position.

7. A propeller shaft and universal joint assembly comprising an elongated tubular shaft; a universal joint yoke; a member wholly confined within and fixed in an end of said shaft and having spaced confronting abutments on its outer face positioning therebetween a portion of said yoke on said member with the arms of said yoke projecting laterally therefrom; means for securing said yoke in the aforesaid position comprising a threaded stud projecting from said member through the yoke, and a nut screwed upon the projecting portion of said stud and engaged with a portion of the yoke.

8. A propeller shaft and universal joint assembly comprising an elongated tubular shaft; a mounting member wholly within said shaft and presenting spaced abutments at the end portion of said shaft; and a universal joint member mounted between said abutments and engaged therewith.

9. A propeller shaft and universal joint assembly comprising a shaft in the form of an elongated tube; a universal joint yoke; a mounting member wholly disposed within and fixed in an end of said tube and having an outwardly facing portion cooperate with the connecting portion of said yoke between the outwardly projecting arms thereof and within said tube end to prevent relative rotation of said yoke and shaft; and means for securing said portions to each other to retain said shaft and yoke in assembled relationship.

10. A propeller shaft and universal joint assembly comprising a tubular shaft; a block fixed in the end of said shaft and having spaced confronting abutments on its outer face defining a channel closed at opposite ends by portions of said shaft end, said channel providing a seat for a universal joint member; a universal joint member having a portion that is positioned in said seat and engaging said abutments with other spaced portions projecting therefrom; and means for securing said member in said seat.

ARCHIBALD A. WARNER.

REFERENCES CITED

The following references are of record in the file of this patent:

UNITED STATES PATENTS

| Number | Name | Date |
| --- | --- | --- |
| 1,180,468 | Bartlett | Apr. 25, 1916 |
| 1,563,629 | Hensley | Dec. 1, 1925 |
| 1,569,838 | Macdonald | Jan. 12, 1926 |
| 1,896,901 | Knapp et al. | Feb. 7, 1933 |
| 1,925,419 | Swenson | Sept. 5, 1933 |
| 2,067,282 | Padgett | Jan. 12, 1937 |
| 2,067,283 | Padgett | Jan. 12, 1937 |
| 2,259,657 | Padgett | Oct. 21, 1941 |
| 2,329,601 | Frye | Sept. 14, 1943 |

FOREIGN PATENTS

| Number | Country | Date |
| --- | --- | --- |
| 457,418 | Great Britain | Nov. 27, 1936 |

Certificate of Correction

Patent No. 2,559,485                                              July 3, 1951

ARCHIBALD A. WARNER

It is hereby certified that error appears in the printed specification of the above numbered patent requiring correction as follows:

Column 2, line 54, for "other" read *outer*; column 6, line 3, for "cooperate" read *cooperative*;

and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*